United States Patent
Tamir

(10) Patent No.: US 10,347,150 B1
(45) Date of Patent: Jul. 9, 2019

(54) VEHICLE OPERATION SIMULATION SYSTEM AND METHOD

(71) Applicant: Modular High-End LTD., Rishpon (IL)

(72) Inventor: Gal Tamir, Herzliya (IL)

(73) Assignee: MODULAR HIGH-END LTD., Rishpon (IL)

( * ) Notice: Subject to any disclaimer, the term of this patent is extended or adjusted under 35 U.S.C. 154(b) by 0 days.

(21) Appl. No.: 16/048,379

(22) Filed: Jul. 30, 2018

(51) Int. Cl.
*G09B 9/042* (2006.01)

(52) U.S. Cl.
CPC .................. *G09B 9/042* (2013.01)

(58) Field of Classification Search
CPC .................................................. G09B 9/042
USPC .......................................................... 434/66
See application file for complete search history.

(56) References Cited

U.S. PATENT DOCUMENTS

2015/0145995 A1* 5/2015 Shahraray ............... H04W 4/70
                                                    348/148
2016/0298971 A1* 10/2016 Mughal .................. B60W 50/14

* cited by examiner

*Primary Examiner* — Robert P Bullington
(74) *Attorney, Agent, or Firm* — Mark M. Friedman

(57) ABSTRACT

A projection assembly displays a virtual driving environment, associated with a vehicle, in the interior portions of an actual vehicle. A capture and processing subsystem includes at least one image sensor and at least one processor, and is removably mounted to the interior of the actual vehicle and is operatively coupled to the projection assembly. The image sensor has a field of view encompassing at least a portion of a driver's side area of the actual vehicle. The processor translates a vehicle operating action performed by a driver of the vehicle to a virtual action in the virtual driving environment. The translation is based in part on images captured by the image sensor.

12 Claims, 7 Drawing Sheets

VEHICLE OPERATION SIMULATION SYSTEM AND METHOD

TECHNICAL FIELD

The present invention relates to vehicle operation simulation systems and methods.

BACKGROUND OF THE INVENTION

Systems for simulating operation of a vehicle are known in the art. Many such systems are based on mechanical models of the vehicle for which operation is to be simulated. For example, a mock-up of the interior of the vehicle is provided and is connected with various electronic and mechanical actuators. This allows the user to simulate operating the vehicle within a physical environment that looks and feels like the actual vehicle on which the simulation is based. One major drawback of systems based on mechanical models is cost, as designing, manufacturing, and maintaining mock-ups and the associated electronics and mechanics can be prohibitively expensive. As a consequence, simulations based on mechanical models that rely on mock-ups are not a feasible simulation option for conventional consumers.

Other systems for simulating operation of a vehicle have been proposed which do not rely on mechanical models and instead use an actual vehicle to conduct the simulation. While such systems may be more cost effective than systems based on mechanical models, other drawbacks are present. Firstly, the simulation of the vehicle operation relies solely on input from the vehicle controls of the actual vehicle, while most conventional vehicles lack any standard interface for such inputs or have no inputs at all. Secondly, the type of vehicle that can be simulated is limited to the actual vehicle type. As such, these types of simulation systems are fundamentally limited in the simulation scenarios they can present to the user.

SUMMARY OF THE INVENTION

The present invention is a system and method for simulating operation of a vehicle in an actual vehicle.

According to the teachings of an embodiment of the present invention, there is provided a system for simulating operation of a vehicle in an actual vehicle. The system comprises: a projection assembly including at least one image projection unit for displaying a virtual driving environment, associated with the vehicle, in the interior portions of the actual vehicle; and a capture and processing subsystem removably mountable to the interior of the actual vehicle and operatively coupled to the projection assembly. The capture and processing subsystem includes: at least one image sensor, the image sensor having a field of view encompassing at least a portion of a driver's side area of the actual vehicle, and at least one processor configured to translate a vehicle operating action performed by a driver of the vehicle to a virtual action in the virtual driving environment, the translation being based in part on images captured by the image sensor.

Optionally, the system further comprises at least one sensor operatively coupled to the processor and functionally associated with a vehicle control element of the actual vehicle, the vehicle control being outside of the field of view of the image sensor.

Optionally, the translation is further based in part on reading an operation state of the vehicle control by the at least one sensor.

Optionally, the vehicle control element includes at least one of a gas pedal or a brake pedal.

Optionally, the system further comprises a control subsystem operatively coupled to the capture and processing subsystem, the control subsystem configured to actuate the capture and processing subsystem to operate in a calibration mode and an operational mode.

Optionally, in the calibration mode, the control subsystem provides the driver with a sequence of vehicle operating actions.

Optionally, the sequence of vehicle operating actions includes operation of a plurality of vehicle controls of the actual vehicle, at least a portion of the vehicle controls being outside of the field of view of the image sensor.

Optionally, the plurality of vehicle controls includes a steering mechanism, a gear shift, a gas pedal, and a brake pedal.

Optionally, the control subsystem includes an application executable on a mobile communication device.

Optionally, the projection assembly is removably mountable to the interior of the actual vehicle.

Optionally, the projection assembly is deployed outside of the actual vehicle.

Optionally, the capture and processing subsystem further includes a communications module for transmitting information to, and receiving information from, a control subsystem.

Optionally, the system further comprises at least one server, the communications module and the control subsystem exchanging information via the server.

Optionally, the system further comprises an audio unit operatively coupled to the projection assembly and the capture and processing subsystem, the audio unit operative to produce sound effects corresponding to the virtual driving environment.

Optionally, the system further comprises at least one actuator mechanically coupled to the actual vehicle and functionally associated with the capture and processing subsystem, the actuator operative to induce movement of the actual vehicle in response to the vehicle operating action performed by the driver.

Optionally, the system further comprises the capture and processing subsystem is retained within a housing having an attachment mechanism for attaching the housing to at least one of the roof or a headrest of the actual vehicle.

There is also provided according to an embodiment of the teachings of the present invention a system for simulating operation of a vehicle in an actual vehicle. The system comprises: at least one image projection unit for displaying a virtual driving environment, associated with the vehicle, in the interior of the actual vehicle; a sensor assembly that includes: an image sensor having a field of view encompassing at least a portion of a driver's side area of the actual vehicle, and at least one sensor reading an operation state of a vehicle control of the actual vehicle, the vehicle control being outside of the field of view of the image sensor; and at least one processor operatively coupled to the image projection unit and the sensor assembly, the processor configured to translate a vehicle operating action performed by a driver of the vehicle to a virtual action in the virtual driving environment, the translation being based in part on images captured by the image sensor, and data sent by the at least one sensor.

There is also provided according to an embodiment of the teachings of the present invention a method for simulating operation of a vehicle in an actual vehicle. The method comprises: displaying a virtual driving environment, associated with the vehicle, in the interior of the actual vehicle; capturing, via an image sensor deployed inside the actual vehicle, at least one image of a vehicle operating action performed by a driver of the vehicle, the image sensor having a field of view encompassing at least a portion of a driver's side area of the actual vehicle; and translating the vehicle operating action performed by the driver to a virtual action in the virtual driving environment, the translating being based in part on the at least one image captured by the image sensor.

Optionally, the method further comprises: instructing, by a control subsystem, the driver to perform a sequence of vehicle operating actions; capturing images of the driver performing the vehicle operating actions; and analyzing, by a processor, the captured images of the driver performing the vehicle operating actions to produce mapping to simulated actions in the virtual driving environment.

There is also provided according to an embodiment of the teachings of the present invention a system for simulating operation of a first vehicle in a first actual vehicle and a second vehicle in a second actual vehicle. The system comprises: a first and a second projection assembly for displaying a virtual driving environment in the interior of a first and a second actual vehicle, respectively; a first and a second image sensor, the first image sensor having a field of view encompassing at least a portion of a driver's side area of the first actual vehicle, and the second image sensor having a field of view encompassing at least a portion of a driver's side area of the second actual vehicle; and at least one server configured to co-process data from the image sensors to translate vehicle operating actions performed by a driver of the first vehicle and a driver of the second vehicle into shared virtual actions in the virtual driving environment.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DESCRIPTION OF THE PREFERRED EMBODIMENTS

Figure 1:
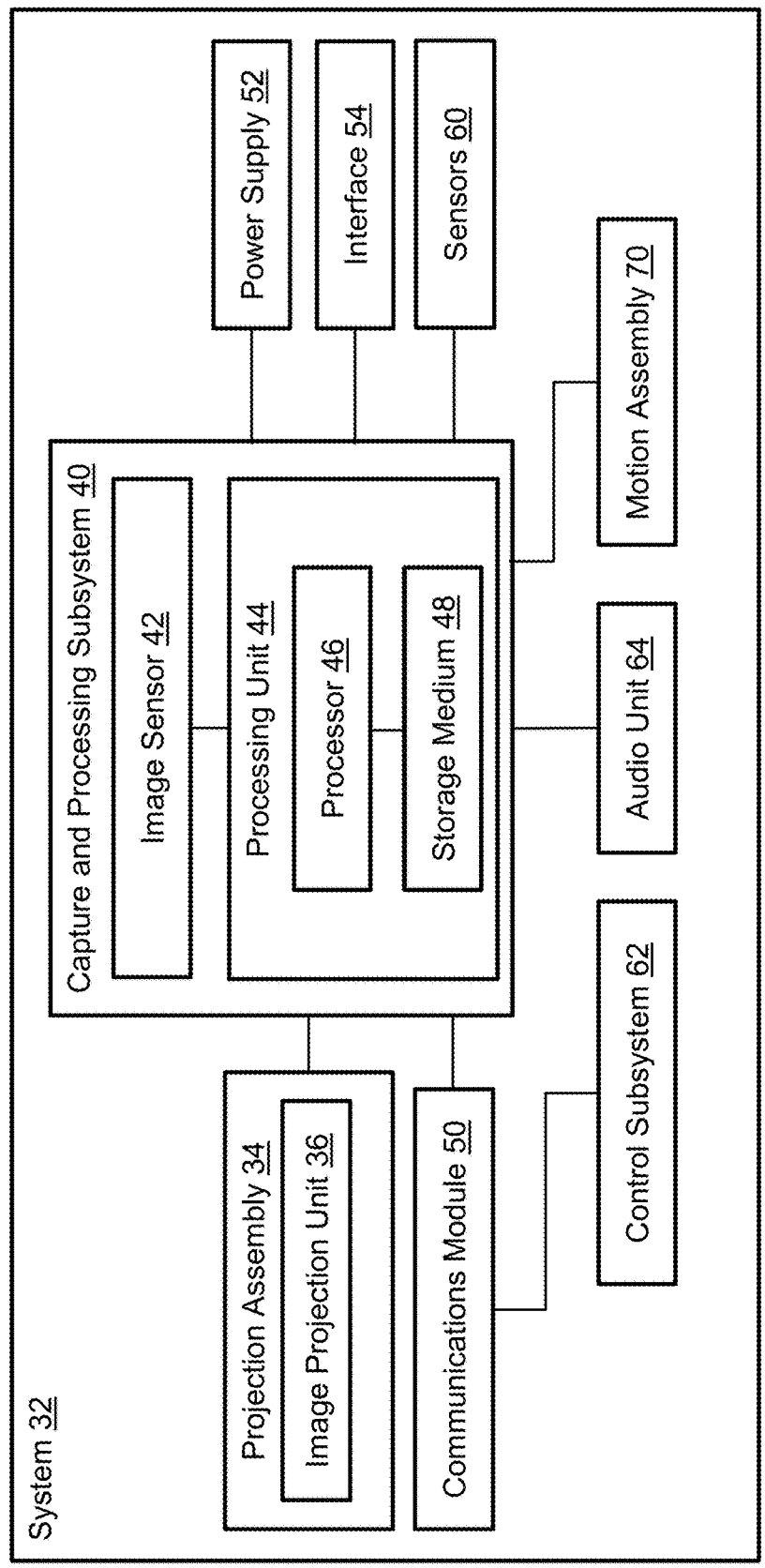
FIG. 1 is a block diagram of a system according to an embodiment of the present invention.

The present invention is a system and method for simulating operation of a vehicle in an actual vehicle.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways. Initially, throughout this document, references are made to directions such as, for example, front and rear, upward and downward, forward and backward, left and right, and the like. These directional references are exemplary only to illustrate the invention and embodiments thereof.

Embodiments of the present disclosure are applicable for a wide range of uses, for example as a recreational entertainment system, and may be of particular value when used as a training system for teaching drivers, and heavy-duty vehicles operators, how to use and operate different types of vehicles.

Referring now to the drawings, FIG. 1 shows a simplified block diagram of a system, generally designated 32, for simulating operation of a vehicle in an actual vehicle, according to an embodiment of the present disclosure. The system 32 simulates for a user (i.e., driver) a driving environment of a vehicle by creating a virtual driving environment in an actual vehicle. In principle, the vehicle for which the virtual driving environment is created, and the actual vehicle in which the system 32 is deployed, can be different types of vehicles or the same type of vehicle. As such, the system 32 enables the user to simulate operation of a vast array of vehicles using a single actual vehicle. In operation, the user of the system 32 performs vehicle operation actions in the actual vehicle, and the system 32 translates those real-world actions to actions in the virtual driving environment. Prior to operating the system 32, the user initially disables the actual vehicle (e.g., engine and fuel injected movement and steering) to allow free movement of the steering wheel and control pedals (e.g., gas and brake pedals) of the actual vehicle during the simulation, without actually driving the actual vehicle.

Generally speaking, the system 32 includes a projection assembly 34, a capture and processing subsystem 40, one or more sensors 60, and a control subsystem 62. The projection assembly 34 includes at least one image projecting unit 36 for projecting images of the virtual driving environment onto a projection screen deployed on surfaces of the interior of the actual vehicle. In certain embodiments, the projection assembly 34 includes a plurality of image projection units 36 (FIG. 3) deployed in spaced relation in the interior of the actual vehicle so as to enable the projection and display of the virtual driving environment across a large portion of the interior of the actual vehicle, resulting in a panoramic virtual driving environment, which may be a full panoramic environment. In other embodiments, such as the embodiment illustrated in FIG. 4, at least some of the projection units 36 are deployed external to the actual vehicle, and project and display the virtual driving environment onto semi-transparent screens attached to the windows and windshields of the actual vehicle, to function as rear-projection screens.

The images projected by the image projection units 36 are provided to the projection assembly 34 by the capture and processing subsystem 40. The image projection units 36 may be implemented as micro short throw projectors, such as, for example, the LG PF1000UW Portable Ultra Short Throw Projector, Sony LSPX-P1 Portable Ultra Short Throw Projector, and the like.

The capture and processing subsystem 40 includes an image sensor 42, a processing unit 44 including at least one processor 46 coupled to a storage medium 48 such as a memory or the like, a communications module 50, a power supply 52, and one or more interfaces 54 for connecting one or more peripheral devices to the capture and processing subsystem 40. For example, the projection assembly 34 may be connected to the capture and processing subsystem 40 via the interface 54. In certain embodiments, the interface 54 that connects the projection assembly 34 to the capture and processing subsystem 40 is a wireless interface, whereby the image projecting unit or units 36 communicate with the capture and processing subsystem 40 wirelessly. In other embodiments, the interface 54 that connects the projection assembly 34 to the capture and processing subsystem 40 is wired interface connection, whereby the image projecting unit or units 36 communicate with the capture and processing subsystem 40 through a wire or cable.

The control subsystem 62 preferably includes at least one processor. The processor 46 and the processor of the control subsystem 62 can be implemented as any number of computer processors, including, but not limited to, a microcontroller, a microprocessor, an ASIC, a DSP, and a state machine. Such processors include, or may be in communication with computer readable media, which stores program code or instruction sets that, when executed by the processor, cause the processor to perform actions. Types of computer readable media include, but are not limited to, electronic, optical, magnetic, or other storage or transmission devices capable of providing a processor with computer readable instructions.

Figure 2:
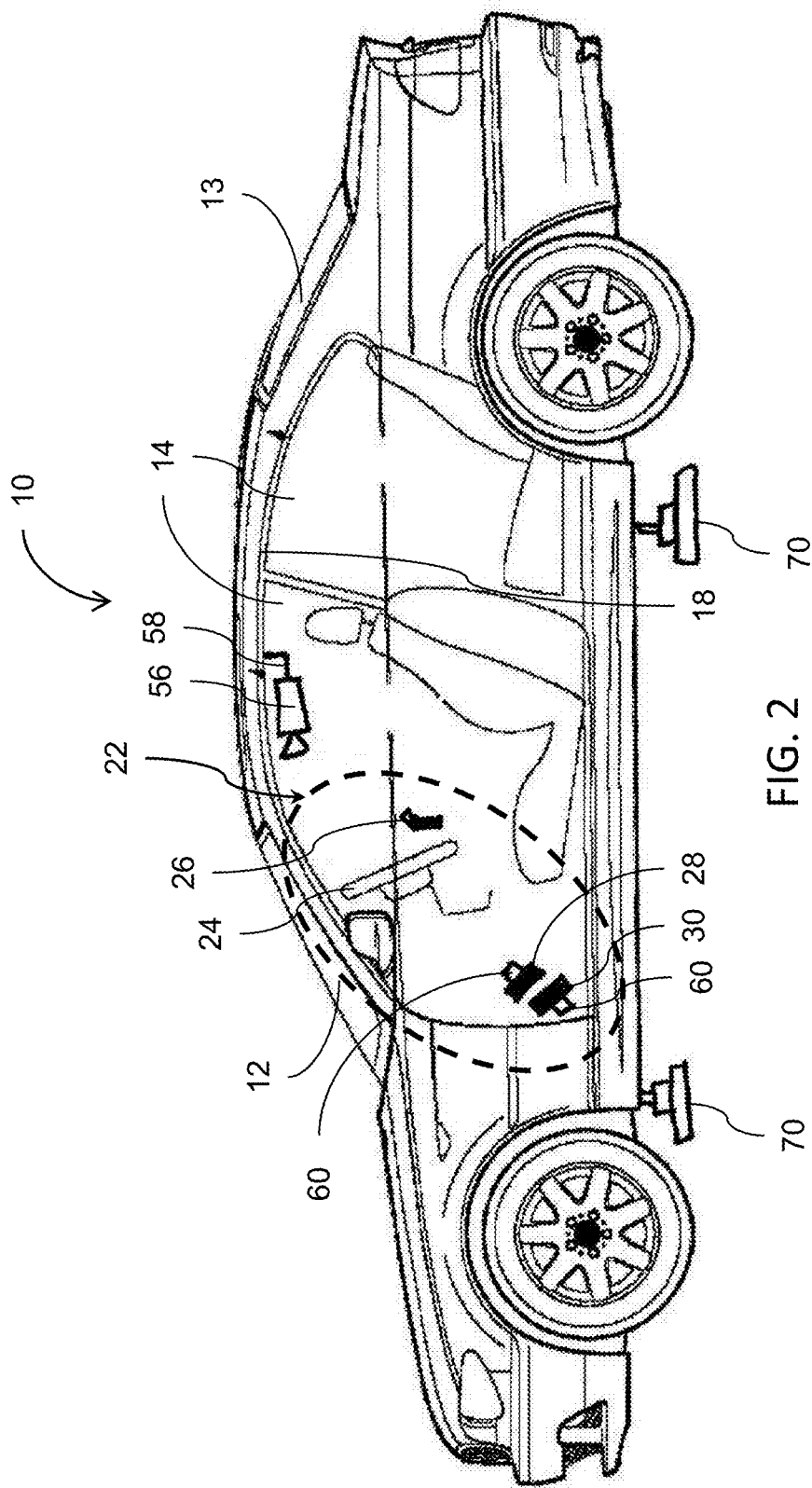
FIG. 2 is a side view illustrating a schematic representation of a vehicle in which a system according to an embodiment of the invention is deployed.

With continued reference to FIG. 1, refer now to FIG. 2, a schematic representation of an actual vehicle 10 in which components of the system 32 can be deployed according to embodiments of the present disclosure. The actual vehicle 10 depicted in FIG. 2 is shown from the perspective of an observer outside of the actual vehicle 10 looking at the driver's side. Portions of the exterior of the driver's side are not shown in FIG. 2, to allow visibility of components of the interior cabin of the actual vehicle 10.

The actual vehicle 10 can be any vehicle which can be operated by a driver to drive in a typical manner. For example, the actual vehicle 10 can be a private vehicle that is owned by a user of the system 32. The actual vehicle 10 includes an array of vehicle controls, designated 22 by the demarcated region in FIG. 2. The vehicle controls 22 include a steering wheel 24, a gear shift 26, a gas pedal 28, and a brake pedal 30, as well as headlight controls, turn signal, and windshield wiper controls. The actual vehicle 10 also includes a front windshield 12, a rear windshield 13, and a plurality of windows 14, and any other components necessary for typical vehicle operation. Although not shown in the drawings, such components include major automotive components, such as, for example, an engine, a transmission system, a clutch pedal, various filtering mechanisms, and the like, as should be apparent to one of ordinary skill in the art.

In embodiments in which the projection assembly 34 is deployed inside the actual vehicle 10, such as in the example embodiment shown in FIG. 2, the image projection units 36 are preferably attached to the actual vehicle 10 in proper perspective against the windows 14 and the windshields 12, 13 via a mechanical attachment mechanism, such as tripod, clips, brackets or any other mechanical fixture, which allow removable attachment of the projection assembly 34 to the actual vehicle 10.

With continued reference to FIG. 2, the capture and processing subsystem 40 is attached to a surface of the actual vehicle 10 via an attachment mechanism 58 of a housing 56 that retains the major components of the capture and processing subsystem 40. In the non-limiting example deployment shown in FIG. 2, the housing 56 is attached to the ceiling 18. However, the housing 56 may alternatively be attached to headrest of the front passenger 17 seat of the actual vehicle 10, or to any other internal part of the actual vehicle 10. The housing 56 may be constructed simply as a box or box like structure that retains the components of the capture and processing subsystem 40. The attachment mechanism 58 may be implemented in a variety of ways, for example, in a non-limiting implementation, the attachment mechanism 58 is implemented as a hook and loop type fastener arrangement, in which the hook portions are attached to the housing 56 and the fabric lining of the ceiling 18 is used as the loop portions. Other attachment mechanism implementations are contemplated, such as, for example, clips and brackets, or mechanisms that utilize rods and pivots or joints which provide spatial separation between the vehicle attachment surface and the housing 56 to provide a degree of adjustment of the pointing angle of the image sensor 42, thereby allowing a user of the system 32 to select the scene that falls within the field of view of the image sensor 42.

In certain preferred embodiments, the attachment mechanism 58 provides removable attachment functionality which enables the housing 56 to be attached to, and detached from, the attachment surface (e.g., the ceiling 18) of the actual vehicle 10. Accordingly, in preferred embodiments, the capture and processing subsystem 40 includes components which facilitate the deployment in different actual vehicles at different times.

Figure 3:
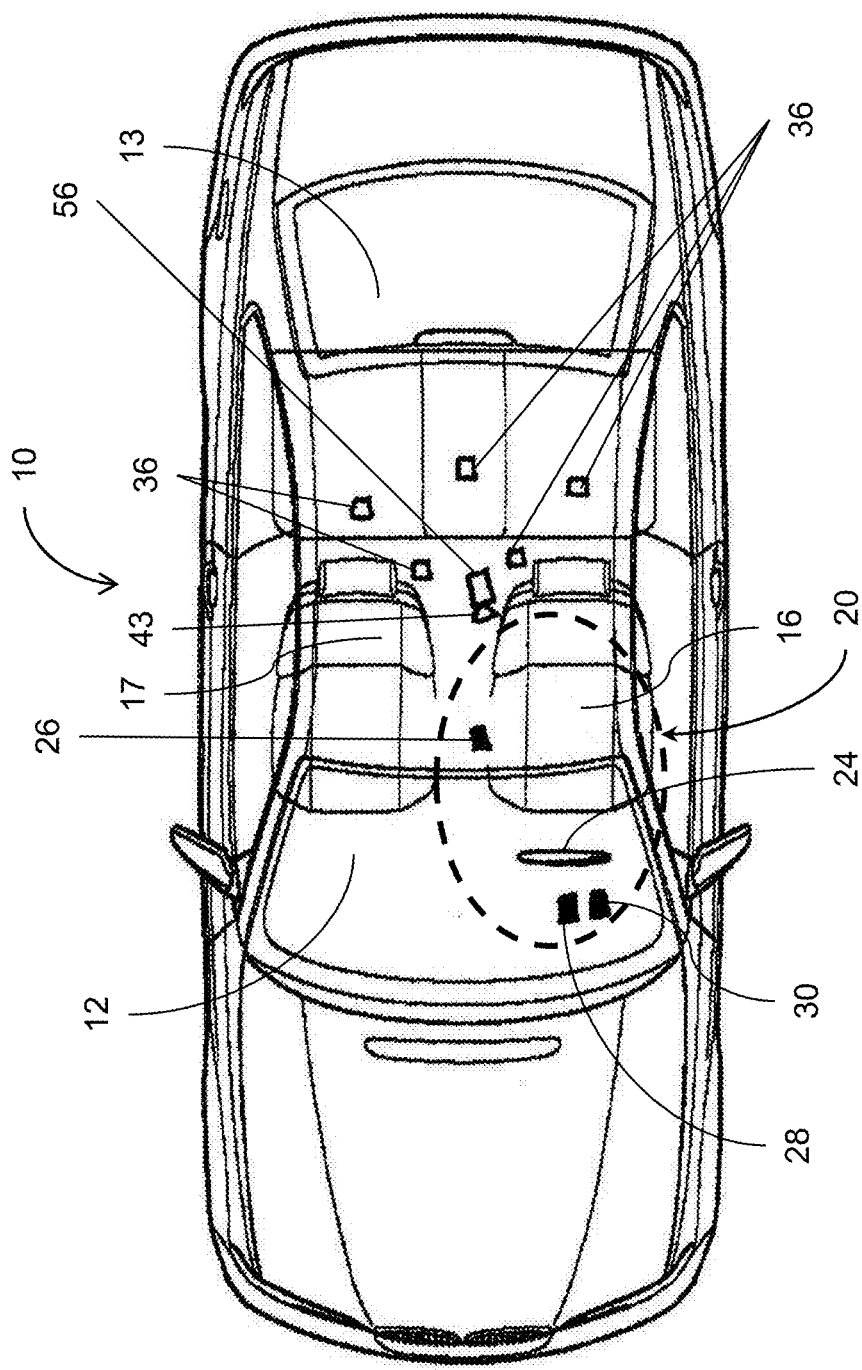
FIG. 3 is a top view illustrating a schematic representation of the vehicle corresponding to FIG. 2.

FIG. 3 illustrates a top view of a schematic representation of the actual vehicle 10, taken from above the actual vehicle 10. When deployed, the housing 56 is preferably positioned toward the front of the actual vehicle 10, along an imaginary line between the driver's seat 16 and the front passenger seat 17. The housing 56 preferably includes an aperture or opening at one end of the housing 56, closer to the front of the interior of the actual vehicle 10, to allow for positioning of a lens 43 of the image sensor 42 in order to provide the image sensor 42 with an unobstructed view of the scene. When deployed in the actual vehicle 10, the image sensor 42 pointing angle is adjusted, for example, via adjustment of the mounting of the housing 56, such that the field of view of the image sensor 42 encompasses portions of a driver's side area of the actual vehicle 10, designated 20 by the demarcated region in FIG. 3. The driver's side area 20 generally refers to the region of space surrounding the driver that is within the driver's immediate arm and leg reach. All of the main vehicle controls 22 are within the driver's side area 20. The portions of the driver side area 20 that are within the field of view of the image sensor 42 are the regions of space occupied by the hand operated elements of the vehicle controls 22. The hand operated elements of the vehicle controls 22 include the steering wheel 24 and the gear shift 26, as well as the headlight controls, turn signal, and windshield wiper control. In certain embodiments, the image sensor 42 has a generally clear and unobstructed view of such hand operated elements of the vehicle controls 22. In such embodiments, the image sensor 42 may be implemented as a visible light camera, such as, for example, a CMOS camera. The gas pedal 28 and the brake pedal 30 are obstructed from view of the image sensor 42, and are therefore generally outside of the field of view of the image sensor 42. Such elements of the vehicle controls 22 that are outside the field of view of the image sensor 42 are referred to hereinafter as "obscured elements".

The capture and processing subsystem 40 is operative to capture images of the driver's side area, via the image sensor 42, as the driver performs vehicle operating actions. Such actions include, but are not limited to, changing gears, turning the steering wheel, activating and deactivating the vehicle headlights, activating and deactivating the turn signal, and operating the windshield wipers.

Within the context of this document, the term "images" generally refers multiple individual images captured in succession at non-equal intervals within a relatively short time duration (e.g., on the order of a few seconds), and also refers to the capture of multiple video frames that compose a video segment of a time duration on the order of a few seconds.

The images captured by the image sensor 42 are processed by the processor 46 of the processing unit 44 via computer vision algorithms/techniques to allow the capture and processing subsystem 40 to comprehend and learn the operation of vehicle that is being simulated by the system 32, based on the vehicle operating actions performed in the actual vehicle 10. The processor 46 then is able to translate vehicle operating actions, performed by the driver of the vehicle, to virtual actions in the virtual driving environment, where the translation of actions is based on the images captured by the image sensor 42. The learning process and subsequent translation of actions will be described in greater detail in subsequent sections of the present disclosure.

For the obscured elements, such as the gas pedal 28 and the brake pedal 30, the capture and processing subsystem 40 receives and processes data from the one or more sensors 60 which are coupled to the obscured elements. As illustrated in FIG. 2, each of the gas pedal 28 and the brake pedal 30 has a sensor 60 coupled thereto. Each of the sensors 60 is operative to read an operation state of the element to which the sensor 60 is coupled. The sensors 60 may be implemented in various ways, for example, as pressure sensors, which can detect the amount of pressure or external force applied to a surface of the obscured element, by the foot of the driver. The operation state of an obscured element preferably varies continuously in proportion to the amount of pressure or external force applied to the obscured element by the driver. For example, when the driver applies a maximal amount of pressure or external force to the gas pedal 28, that pressure or external force translates to a maximum fuel injection operation state of the gas pedal 28. Likewise, when the driver applies no pressure or external force to the gas pedal 28, that lack of pressure or external force translates to a minimum fuel injection operation state of the gas pedal 28. Similarly, when the driver applies a maximal amount of pressure or external force to the brake pedal 30, that pressure or external force translates to a maximum braking operation state of the brake pedal 30. Likewise, when the driver applies no pressure or external force to the brake pedal 30, that lack of pressure or external force translates to a minimum braking operation state of the brake pedal 30.

The above-mentioned examples of operation states represent only a sample of the operation states of the respective obscured elements, and in particular represent the extreme operation states of the respective obscured elements. As should be apparent, intermediate operation states are also read, by the sensors 60, corresponding to moderate amounts of pressure or external force applied to the gas pedal 28 or brake pedal 30, that fall between the maximal and minimal amount of applied pressure or external force.

Figure 4:
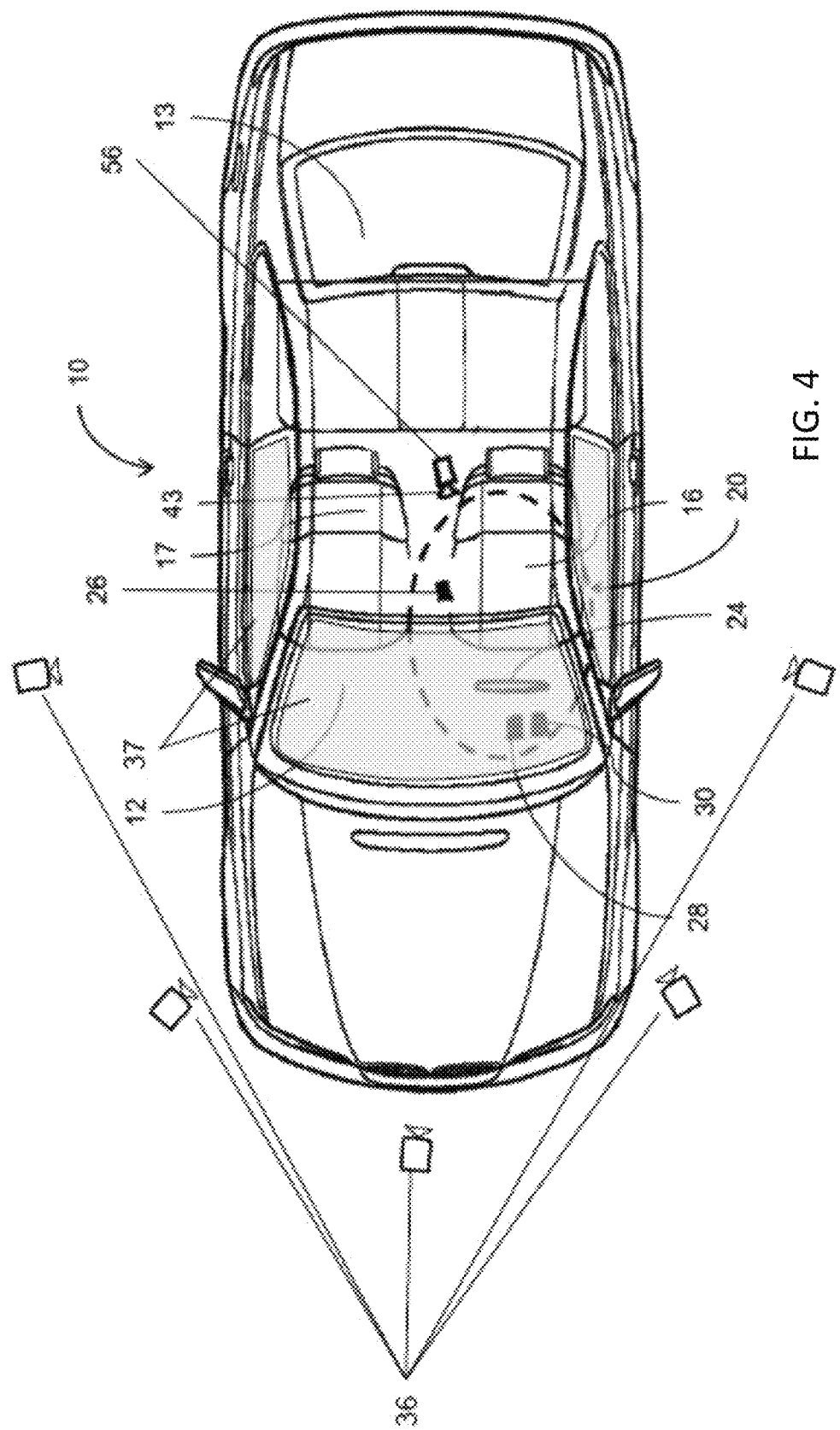
FIG. 4 is a top view illustrating a schematic representation of the vehicle corresponding to FIG. 2 according to an alternate deployment of the system according to an embodiment of the present invention.

As mentioned above, one or more of the image projection units 36 may be deployed outside of the actual vehicle 10 to project images onto semi-transparent screens, which function as rear-projection screens. FIG. 4 illustrates a top view illustrating a schematic representation of such an embodiment, in which five image projection units 36 are deployed outside of the actual vehicle 10. The image projection units 36 are deployed in spaced relation around the front, driver's side, and front passenger's side portions of the actual vehicle 10 and project images through semi-transparent screens 37 attached to the windows 14 and the front windshield 12.

Referring again to FIG. 1, the control subsystem 62 functions to control the capture and processing subsystem 40 and the projection assembly 34 to operate the simulated environment for the user, and acts as an interface between the system 32 and the user. In certain embodiments, the control subsystem 62 communicates with the capture and processing subsystem 40 through the communications module 50 which may be implemented as a SIM card or micro SIM, which provides data transfer functionality via cellular communication protocols between the capture and processing subsystem 40 and the control subsystem 62. In other embodiments, the control subsystem 62 communicates with the capture and processing subsystem 40 through a short range wireless communication standard such as, for example, IEEE 802.15.1 (i.e., Bluetooth), IEEE 802.15.4 (i.e., Zigbee) and the like, or through a wired interface.

The control subsystem 62 is configured to actuate the system 32, and thereby the capture and processing subsystem 40, to operate in two distinct modes of operation, namely a first mode (referred to interchangeably as a "calibration mode") and a second mode (referred to interchangeably as an "operational mode"). The control subsystem 62 provides a control signal, based on a user control input command, to the capture and processing subsystem 40 to operate in the selected mode. Note that prior to operation of the system 32 in either of the two modes, the system components, more specifically the capture and processing subsystem 40 and the projection assembly 34, are deployed relative to the actual vehicle 10 (i.e., inside or outside) by the user (or an operator of the system 32), in accordance with the deployment methodology described in previous sections of the present disclosure.

In the calibration mode, the capture and processing subsystem 40 is operated in conjunction with vehicle operation actions performed by the driver, to allow the capture and processing subsystem 40 to learn the operation of vehicle that is being simulated by the system 32 based on the actions performed by the driver. In certain embodiments, the control subsystem 62 provides the user (i.e., the driver) with a sequence of vehicle operating actions to perform. The sequence of vehicle operating actions provided by the control subsystem 62 may be conveyed to the user in various formats, such as, for example, in a visual format as text or video via a display system connected to the control subsystem 62, and/or in an audible format via a speaker system connected to the control subsystem 62. The capture and processing subsystem 40 takes a responsive action in response the driver's performance of each vehicle operating action in the sequence.

An example of a sequence of vehicle operating actions provided to the driver by the control subsystem 62 is as follows: 1) turn the steering wheel 24 to the left by a certain amount (e.g., 30 degrees counter clockwise rotation), 2) turn the steering wheel 24 to the right by a certain amount (e.g., 30 degrees clockwise rotation), 3) place the gear shift 26 in the park (P) position, 4) place the gear shift 26 in the reverse (R) position, 5) place the gear shift 26 in the drive (D) position, 6) place the gear shift 26 in the neutral (N) position, 7) apply light pressure to (i.e., tap on) the gas pedal 28, 8) apply full pressure to the gas pedal 28, 9) apply light pressure to (i.e., tap on) the brake pedal 30, 10) apply full pressure to the brake pedal 30, 11) operate the turn signal to signal a right turn, and 12) operate the turn signal to signal a left turn. Note that the above sequence of vehicle operating actions is for example purposes only, and additional or fewer vehicle operating actions may be provided to the driver by the control subsystem 62 during operation of the system 32 in calibration mode.

The capture and processing subsystem 40 captures, via the image sensor 42, images of the driver during each vehicle operating action, and subsequently processes (i.e., analyzes), via the processing unit 44, the captured images according to computer vision and machine learning algorithms, in order to construct a mapping between driver performed actions in the actual vehicle and simulated actions in the virtual driving environment. For example, the image sensor 42 may capture images in response to the instruction to the driver to turn the steering wheel 24 to the left by a certain amount. The captured images are processed by the processing unit 44 to extrapolate and interpolate the turn amount performed by the driver to larger and smaller degrees of turn, respectively. The extrapolation and interpolation may be aided by processing the captured images together with other captured images in response to instructions to the driver to turn the steering by a different amount. The real world left turn actions performed by the driver are then translated to virtual actions in the virtual driving environment, based on the mapping. Similar principles apply to other vehicle operating actions performed by the driver.

The mapping may include variable relationships between the real-world coordinate position of objects in three-dimensional space, and the virtual images projected by the image projection units 36. The mapping between real world actions and virtual actions may be stored in a structure format in a memory or storage device of the system 32, for example the storage medium 48. In network-based embodiments, the mapping may be stored in a remote server or server system that is remotely deployed from the capture and processing subsystem 40.

Once calibration mode is complete, the system 32 is actuated, via user input control through the control subsystem 62, to operate in operational mode. In operational mode, the capture and processing subsystem 40 is operated in conjunction with the projection assembly 34 and vehicle operation actions performed by the driver, to simulate a vehicle driving environment for the user. In operational mode, the user may select, via the control subsystem 62, a simulated driving environment (i.e., a simulation scenario) according to a plurality of simulation characteristics, including, but not limited to, the performance of the simulated vehicle (which may include the simulated vehicle type), road conditions, weather conditions, time of day and lighting conditions. As such, the user may operate the system 32 using an actual vehicle 10, implemented for example as a Ford Focus parked in a parking garage in a suburban city in North America, to simulate driving a Toyota Land Cruiser on a dirt road in the snow at night in Eastern Europe.

The projection assembly 34 projects virtual images corresponding to the virtual driving environment on the interior of the actual vehicle 10, preferably on a projection screen arrangement deployed on the interior portion of the windshield and windows of the actual vehicle 10. The virtual driving environment projection includes images of various aspects of the simulated environment (i.e., background images), including, but not limited to, the roads on which the virtual vehicle drives, the surroundings of the virtual vehicle (e.g., parks, buildings, shops, pedestrians, vehicle traffic, bicycle traffic, etc.), whether conditions (e.g., fog, rain, snow, sleet, etc.), and lighting conditions (e.g., daytime lighting, nighttime lighting, overcast lighting, etc.).

In certain embodiments, the rear-view mirror of the actual vehicle 10 is also covered with a portion of the projection screen, and the portion of the virtual images projected onto the rear-view mirror projection screen are images that appear to the driver as reflected images from rear outside of the vehicle during the simulation. In such embodiments, it may be advantageous to utilize a dedicated image projection unit 36 for the portion of the virtual images projected onto the rear-view mirror projection screen. Alternatively, one of the image projection units may be implemented as a narrow display (such as a LED or LCD screen), deployed on the rear-view mirror, similar in size to the size of the mirror.

Figure 5:
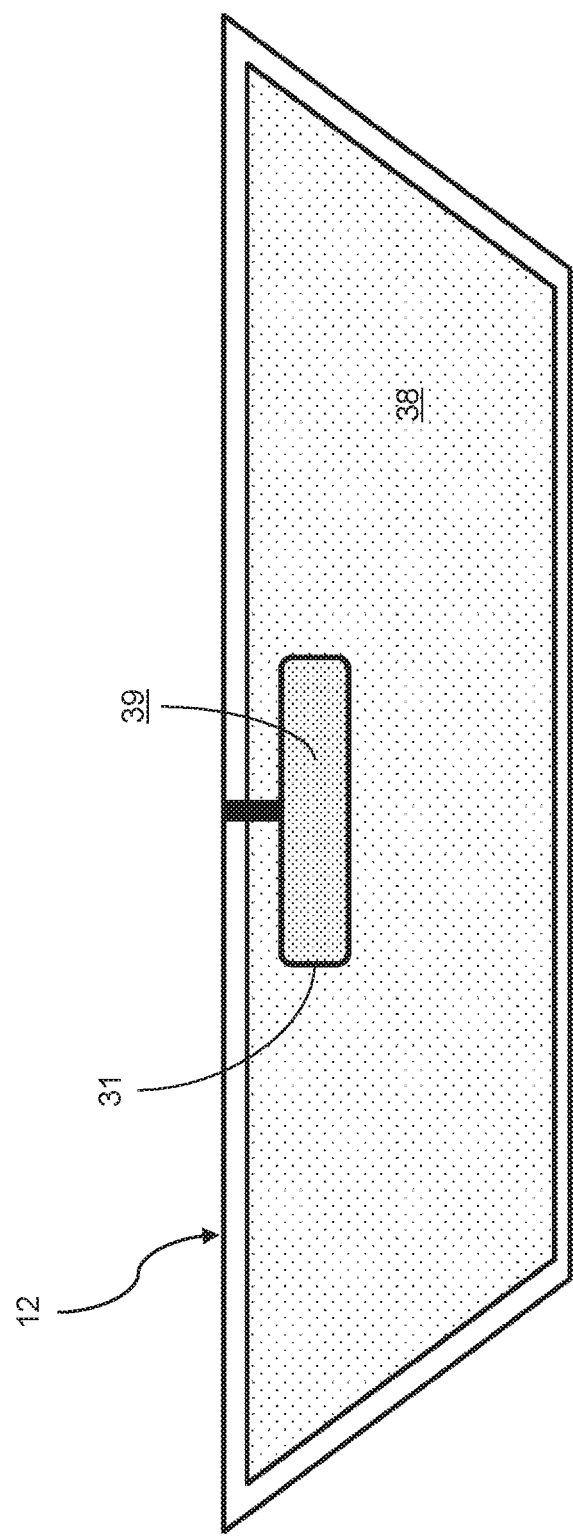
FIG. 5 is a cut-away view from a driver's perspective illustrating a schematic representation of the vehicle corresponding to FIGS. 2-4.

Refer now to FIG. 5, a cut-away view of the front of the interior of the actual vehicle 10, showing at least the front windshield 12 and the rear-view mirror 31 from the driver's perspective. The images projected onto the front windshield 12 and onto, or displayed by, the rear-view mirror 31, corresponding to the virtual driving environment, are schematically designated 38 and 39, respectively. Note that although not shown in the drawings, the projected virtual images may extend to the windows 14 and the rear windshield 13 of the actual vehicle 10 as well to produce a panoramic or full panoramic view of the virtual driving environment.

The image projection units 36 and the projection screens are preferably deployed in spaced relation such that the driver (i.e., the user of the system 32) is provided with a panoramic, and more preferably a full or nearly full panoramic, view of the virtual driving environment during operation of the system 32 in operational mode. The term "panoramic view of the virtual driving environment" generally refers to an environment in which the driver is able to view the projected virtual images corresponding to the virtual driving environment across a wide viewing angle (e.g., greater than 180 degrees). The term "full panoramic view of the virtual driving environment" generally refers to an environment in which the driver is able to view the projected virtual images corresponding to the virtual driving environment across a super wide viewing angle (e.g., close to 360 degrees). As such, in a full panoramic virtual driving environment, the driver is able to view the projected virtual images corresponding to the virtual driving environment regardless of how much the driver changes his or her gaze and rotates his or her head about the yaw axis (i.e., the axis of rotation normal to the plane on which the actual vehicle 10 sits. In other words, in a full panoramic virtual driving environment, the driver is able to view the projected virtual images when looking forward through the front windshield, when looking backward through the rear windshield, when looking to the left through the driver's side window, when looking right through the passenger's side windows, and all or nearly all areas in between.

In order to provide a more realistic simulated environment, a cover or tarp may be deployed to cover the exterior portions of the actual vehicle 10 to reduce the amount of ambient light inside of the actual vehicle 10, thereby providing a more ideal lighting environment for the projection assembly 34.

In operational mode, the capture and processing subsystem 40 captures, via the image sensor 42, images of the driver as the driver performs various vehicle operating actions in the actual vehicle 10. The images captured during operation of the system 32 in operational mode are analyzed (i.e., processed) by the processing unit 44 to translate the real-world vehicle operating actions to virtual actions in the virtual driving environment, based on the mapping created during calibration mode. The capture and processing subsystem 40 then actuates the projection assembly 34 to update the projected virtual images according to the translation of the real-world action. Consider, for example, the driver turning the steering wheel 24 to the left by 30 degrees. The image sensor 42 captures images of the steering wheel action performed by the driver. The captured images are processed by the processing unit 44 according to the mapping created during calibration mode. The capture and processing subsystem 40 determines that the left turn action performed by the driver in the real world corresponds to a similar left turn action in the virtual driving environment. In response to the real-world left turn action, the capture and processing subsystem 40 actuates the projection assembly 34 to update the projected virtual images to display a change in driving direction to the driver corresponding to the 30-degree turn amount. This may be accomplished by panning the projected virtual image to right by an amount corresponding to the degree of turn. In addition, projected virtual images of all aspects of the simulated environment are updated, such that as the virtual vehicle turns, the background images of the objects (e.g., other vehicles, pedestrians, bicycles, streets, buildings, etc.) surrounding the virtual vehicle are updated.

Referring again to FIG. 1, the system 32 according to certain embodiments may further include an audio unit 64 connected to the capture and processing subsystem 40 via one of the interfaces 54 to provide audio sound effects corresponding to the virtual images of the virtual driving environment during operation of the system 32 in operational mode. For example, the audio unit 64 may be actuated to play sound effects corresponding to vehicle traffic, pedestrians, whether events, construction noises, or any other audible sound a driver may hear while operating a vehicle in the real world. The audio unit 64 may be deployed inside the actual vehicle 10 via an attachment mechanism, similar to the attachment methodology described with reference to the capture and processing subsystem 40 and the projection assembly 34. In certain embodiments, the audio unit 64 is implemented as an audio source device coupled to one or more loudspeakers. The audio source device may include a memory for storing different audio files and electronic components for converting the stored audio files to electrical audio signals which are provided to the loudspeakers. As should be apparent to one of ordinary skill in the art, the electronic components may include amplifiers, digital to analog conversion circuitry, filters, and the like. In such embodiments, the capture and processing subsystem 40 is operative to actuate the audio unit 64 to play audio that corresponds to the virtual images of the virtual driving environment. In other embodiments, the audio unit 64 is implemented strictly as one or more loudspeaker, and the audio source device components are integrated into the processing unit 44 of the capture and processing subsystem 40.

Referring to FIGS. 1 and 2, the system 32 according to certain embodiments may further include a motion assembly 70 mechanically attached to components of the actual vehicle 10 and connected to the capture and processing subsystem 40 via one of the interfaces 54. The motion assembly 70 enhances the experience of the driver during the simulation executed in operational mode by making the simulation more realistic. In the example embodiment illustrated in FIG. 2, the motion assembly 70 is implemented as a plurality of mechanical actuators attached near the wheels of the actual vehicle 10, preferably along portions of the vehicle chassis where a jack would be placed. The mechanical actuators may be linear actuators or pistons which cause the actual vehicle 10 to move periodically or intermittently during operation of the system 32 in operational mode, and in response to the vehicle operating actions performed by the driver during operation of the system 32 in operational mode. The movement induced by the motion assembly 70 is moderate movement, which includes, for example, vibration, lifting and lowering of the front of the actual vehicle 10, lifting and lowering of the rear of the actual vehicle 10, lifting and lowering of the left and/or right sides of the actual vehicle 10, and the like. The lifting and lowering may be, for example, up to 45 degrees. In other embodiments, the motion assembly 70 may be implemented as a controlled motion platform attached to mechanical actuators (e.g., a hydraulic platform) on which the actual vehicle 10 is mounted, that can vibrate and provide pitch and angle adjustments. In yet other embodiments, the motion assembly 70 may be implemented as a vibration unit deployed under the driver's seat, which causes the driver's seat to vibrate during operation of the system 32 in operational mode.

The capture and processing subsystem 40 is operative to actuate the motion assembly 70 during operation of the system 32 in operational mode. For example, the capture and processing subsystem 40 may actuate the motion assembly 70 to periodically or intermittently vibrate throughout the duration of operational mode, to simulate the sensation of driving along a road. The level of vibration may be attenuated according to the specific characteristics of the simulation. For example, the level of vibration is relatively high in simulations in which a dirt road is traversed, whereas the level of vibration is relatively low in simulations in which a freshly paved road is traversed. As a further example, the capture and processing subsystem 40 may actuate the motion assembly 70 to lift or lower portions of the actual vehicle 10 according to the road characteristics of the simulation. For example, the capture and processing subsystem 40 may actuate the motion assembly 70 to pitch the vehicle upwards in simulations in which the virtual vehicle ascends a hill, and may actuate the motion assembly 70 to pitch the vehicle downwards in simulations in which the virtual vehicle descends a hill.

In addition, the capture and processing subsystem 40 may actuate the motion assembly 70 to take specific actions in response to vehicle operating actions performed by the driver. For example, if the driver puts pressure on the gas pedal 28 to accelerate the vehicle, the capture and processing subsystem 40 may actuate the motion assembly 70 to pitch the vehicle upwards to force the driver's body back into the driver's seat. This may be accomplished by actuating the linear actuators at the front of the actual vehicle 10 to lift the front portion of the actual vehicle 10, or by actuating the linear actuators at the rear of the actual vehicle 10 to lower the rear portion of the actual vehicle 10, or a combination thereof. Similarly, if the driver puts pressure on the brake pedal 30 to decelerate the vehicle, the capture and processing subsystem 40 may actuate the motion assembly 70 to pitch the vehicle downwards to force the driver's body forward away from the driver's seat. This may be accomplished by actuating the linear actuators at the rear of the actual vehicle 10 to lift the rear portion of the actual vehicle 10, or by actuating the linear actuators at the front of the actual vehicle 10 to lower the front portion of the actual vehicle 10, or a combination thereof. Similarly, if the driver turns the steering wheel 24 to the left, the capture and processing subsystem 40 may actuate the motion assembly 70 to cause the linear actuators at the driver's side of the actual vehicle 10 to lift the driver's side of the actual vehicle 10 to force the driver's body toward the front passenger's side door. Similarly, if the driver turns the steering wheel 24 to the right, the capture and processing subsystem 40 may actuate the motion assembly 70 to cause the linear actuators at the driver's side of the actual vehicle 10 to lift the passenger's side of the actual vehicle 10 to force the driver's body toward the driver's side door.

The capture and processing subsystem 40 synchronizes the actuation of the major subcomponents of the system 32 that are controlled by the capture and processing subsystem 40. As such, the projection assembly 34, the audio unit 64, and the motion assembly 70 are all operated in synchrony with each other. The capture and processing subsystem 40 may provide a common timing signal to the aforementioned subcomponents to ensure synchronization.

In operational mode, the capture and processing subsystem 40 may be further configured to collect driver performance data based on performance measurements, and derive statistical information related to the performance measurements. The performance measurements may be based on the quality of the driver performance while operating the vehicle in the virtual driving environment. When the system 32 is used within the context of a driver's education or training program, the capture and processing subsystem 40 can collect performance data, by, for example, assigning a score to the driver by tabulating positive points in response to correct driver actions in certain scenarios, and negative points in response to incorrect actions in certain scenarios. As a more specific example, the capture and processing subsystem 40 may tabulate negative points if the driver does not properly stop at a stop sign or traffic signal, and may assign points if the driver properly yields the right of way to a virtual vehicle at an intersection in the virtual driving environment.

The performance data is collected and processed by the capture and processing subsystem 40. The collected data, for a particular user, and corresponding statistical data derived from the collected data, may be stored locally in a memory of the capture and processing subsystem 40, or in a remote storage location, such as a server or server system linked to the capture and processing subsystem 40 via a network.

Figure 6:
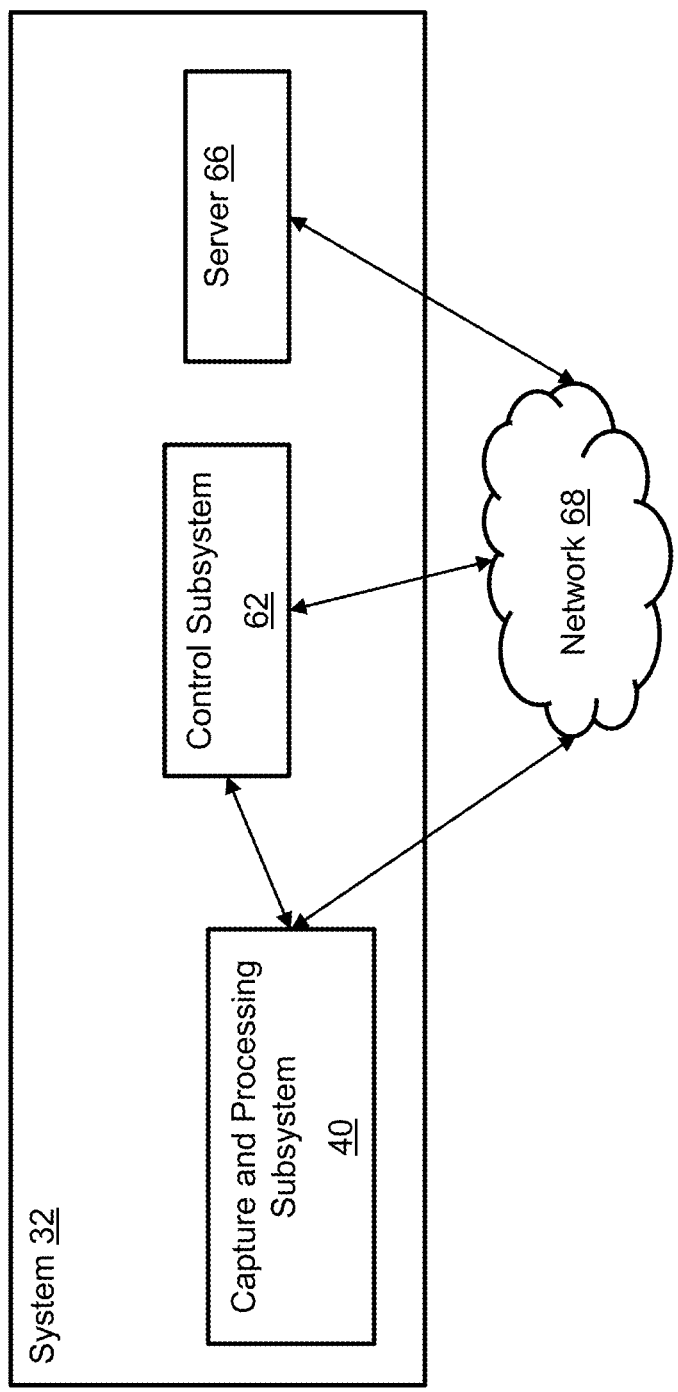
FIG. 6 is a diagram illustrating a networked environment in which a system according to an embodiment of the invention is deployed.

Referring now to FIG. 6, an illustrative example environment in which embodiments of the system 32 may be performed over a network 68. The network 68 may be formed of one or more networks, including for example, the Internet, cellular networks, wide area, public, and local networks.

As is shown in FIG. 6, the system 32 further includes a server 66, which in certain embodiments may be implemented as a remote server, such as, for example, a cloud server or server system formed of one or more linked servers, that is linked to the network 68. The capture and processing subsystem 40, the control subsystem 62, and the server 66 are all linked, either directly or indirectly, via the network 68. In such network-based embodiments, the capture and processing subsystem 40 may be configured to communicate, via the communications module 50, with the control subsystem 62 (i.e., transmit/receive information/data) through the network 68.

According to certain embodiments, the server 66 is configured to maintain data and information related to the virtual driving environment. For example, all mappings derived by the processing unit 44 during calibration mode are preferably stored on the server 66. In this way, the capture and processing subsystem 40 may retrieve the stored mappings from the server 66 before beginning operation in operational mode and after completion of calibration mode, and store such retrieved mappings in a local volatile memory. The volatile memory may be embedded within the capture and processing subsystem 40, for example, inside the processing unit 44, or may be external to the capture and processing subsystem 40 and connected to the processing unit 44 via a data bus or data communication line. In addition, the server 66 may store the data collected and processed by the capture and processing subsystem 40.

In addition to collected and processed data, the server 66 may also be configured to store virtual driving environment information, and management data related to each virtual driving environment and user. For example, if a particular user operates the system 32 to operate in a virtual driving environment A, the server 66 can store user-related information, such as, for example, name, age, and location, as well as the virtual driving environment in which the particular user operated the system 32. Preferably, the user can create a personalized account, via the control subsystem 62, which sends all user-related information to the server 66.

Although embodiments of the present disclosure as described thus far have pertained to a virtual driving environment deployed in a single actual vehicle to allow a user to simulate operation of a virtual vehicle, other embodiments are possible in which multiple capture and processing subsystems linked to the same server (or one or more linked servers) are deployed in respective virtual vehicles, thereby creating a joint virtual driving environment shared between multiple users of different actual vehicles.

Figure 7:
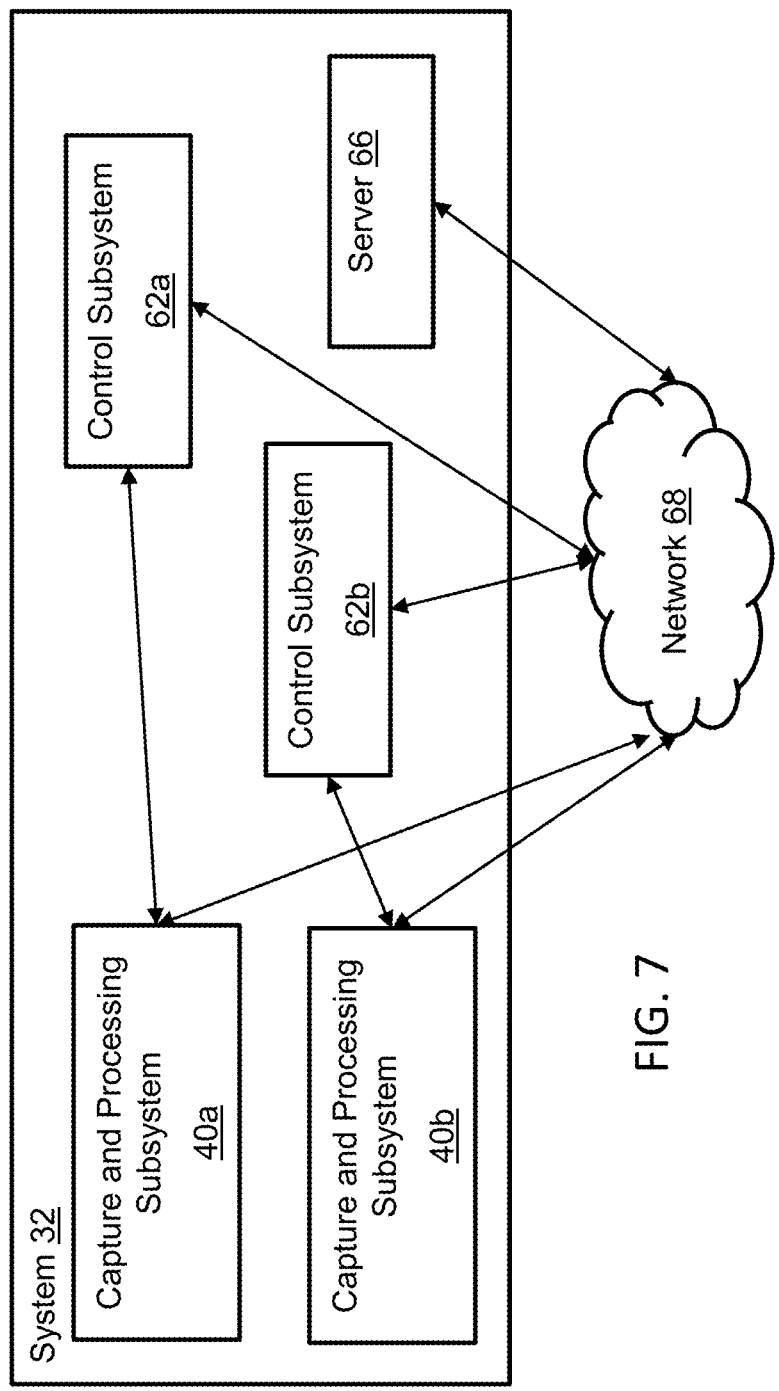
FIG. 7 is a diagram illustrating a networked environment in which a system according to another embodiment of the invention is deployed.

FIG. 7 illustrates an example environment in which such embodiments may be performed over the network 68 using the server 66. The system includes multiple capture and processing subsystems 40, which may each have their own control subsystem 62 or share a single control subsystem 62. In the non-limiting example environment illustrated n FIG. 7, two such capture and processing subsystems are shown (i.e., a first capture and processing subsystem 40a and a second capture and processing subsystem 40b), each having a corresponding control subsystem (i.e., a first control subsystem 62a and a second control subsystem 62b).

In such embodiments, the first capture and processing subsystem 40a is deployed in a first actual vehicle, and the second capture and processing subsystem 40b is deployed in a second actual vehicle, which may be geographically separated from the first actual vehicle. Although not shown in the drawings, each of the actual vehicles has a corresponding projection assembly to project virtual images for viewing by the driver of the actual vehicle, and has a corresponding image sensor and one or more sensors (i.e., gas pedal and brake pedal sensors) for providing sensor data to the corresponding capture and processing subsystem. The virtual driving environment viewed in the first actual vehicle includes the simulated actions (i.e., translated actions) of the driver of the second actual vehicle, and vice versa. As such, the second virtual vehicle appears as part of the virtual driving environment of the first actual vehicle and vice versa. The two virtual driving environments may be the same virtual driving environment. In other words, the same background virtual images may be projected into both actual vehicles. Alternatively, the two virtual driving environments may be different virtual driving environments having different background virtual images.

To achieve this effect, the server 66 preferably receives sensor data collected by the capture and processing subsystems 40a, 40b and co-processes the received collected data to translate the real-world vehicle operating actions in the two actual vehicles into virtual actions in a single shared virtual scenario. In this way, the system allows two or more users of separate actual vehicles to train together and/or compete with each other. For example, one virtual vehicle can pass another virtual vehicle and even cause a virtual car accident in which one virtual vehicle collides with another virtual vehicle operated by another user of the system.

In such embodiments the driving performance data of the different drivers may be collected and processed by the server 66, which functions as a shared server for all the users, or by an array of connected or linked servers, to synthesize the drivers' performance into one unified virtual scenario (i.e., simulation). The collected data of such shared simulations may be used by the server 66 to produce statistical, comparative and historical data, among the various users.

The system 32 may be deployed for various actual vehicle types. In the non-limiting deployment illustrated in drawings, the system 32 is deployed for use with a private vehicle in order to simulate the driving operation of a different type of private vehicle.

In other non-limiting deployments, the system 32 may be deployed for use with heavy-duty vehicles, including, but not limited to, tractor-trailer trucks, bulldozers, forklifts, drillers, diggers, and the like. In such deployments, the actual vehicle is a heavy-duty vehicle, and the vehicle operated in the virtual driving environment is also a heavy-duty vehicle.

In yet another non-limiting deployment, the system 32 may be deployed for use with military vehicles, including, but not limited to, jeeps, high mobility multipurpose wheeled vehicles (i.e., Humvees), armored personnel carriers, tanks, and the like. In such deployments, the actual vehicle is a military vehicle, and the vehicle operated in the virtual driving environment is also a military vehicle.

As discussed thus far, the embodiments of the control subsystem 62 of the system 32 of the present disclosure have been described in terms of the logical command and data flow between the control subsystem 62 and the capture and processing subsystem 40. The control subsystem 62 may be advantageously implemented in ways which allow for mobility of the control subsystem 62 and effective accessibility of the data provided to the control subsystem 62. As such, according to certain embodiments, the control subsystem 62 is implemented as a management application executable on a mobile communication device carried or operated by the user of the system 32. The management application may be implemented as a plurality of software instructions or computer readable program code executed on one or more processors of the mobile communication device. Examples of mobile communication devices which can execute the management application include, but are not limited to, smartphones, tablets, laptop computers, and the like. Such devices typically included hardware and software which provide access to a network, such as the network 68, which allow transfer of data to and from the network.

The management application provides a command and control interface between the user and the major components of system 32. In a non-limiting implementation, the management application includes a display area with a home screen having multiple icons for commanding the system 32 to take actions based on user touchscreen input. The display area may also include a display region for displaying information in response to commands input to the system 32 by the user via the management application. The management application is preferably downloadable via an application server and executed by the operating system of the mobile communication device.

One of the icons may provide an option to pair the management application with the capture and processing subsystem 40. The pairing process is carried out prior to operating the system 32 in calibration or operational modes. One or more of the remaining icons may be used to provide the user of the system 32 with information about the system 32 and system settings. For example, a video may be displayed in the display region of the management application providing user instructions on how to pair the management application with the capture and processing subsystem 40, how to operate the system 32 in calibration and operational modes, how to view statistical data, how to generate and download virtual driving environments according to various preferences, and other tasks.

The generation of virtual driving environments may be performed by the user via the control subsystem 62. The generation of a virtual driving environment may include, for example, selecting characteristics of the virtual driving environment, including, but not limited to, virtual vehicle type, virtual driving location (including roads and landmarks) from a location database stored for example on the server 66, selecting a virtual road condition, virtual traffic conditions, virtual whether conditions, and virtual weather conditions.

Note that the functionality of the management application may also be provided to the user of the system 32 through a web site, which may be hosted by a web server (not shown) linked to the server 66 over the network 68.

Although embodiments of the system 32 as described thus far have pertained to utilizing an image sensor 42 implemented as a visible light camera for capturing images of elements of vehicle controls to which the image sensor 42 has an unobstructed view, other embodiments are possible in which the image sensor 42 is implemented as an infrared (IR) image sensor. In such embodiments, the image sensor 42 is able to capture images of all vehicle controls, regardless of obstructed view. In such embodiments, for example, the image sensor 42 may also capture images of the gas pedal 28 and the brake pedal 30, thereby no longer necessitating the use of the sensors 60 to read the operation state of the pedals 28 and 30. Alternatively, the capture and processing subsystem 40 may rely on a combination of the IR images captured by the IR image sensor and sensor data captured by the sensors 60.

Implementation of the system and/or method of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. As discussed above, the data management application may be implemented as a plurality of software instructions or computer readable program code executed on one or more processors of a mobile communication device. As such, in an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The block diagrams in the drawings illustrate the architecture, functionality, and operation of possible implementations of systems, devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form, "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A system for simulating operation of a vehicle in an actual vehicle, the system comprising:
   a projection assembly including at least one image projection unit for displaying a virtual driving environment, associated with the vehicle, in interior portions of the actual vehicle; and
   a capture and processing subsystem removably mountable to an interior of the actual vehicle and operatively coupled to the projection assembly, the capture and processing subsystem including:
      at least one image sensor, the at least one image sensor having a field of view encompassing at least a portion of a driver's side area of the actual vehicle, and
      at least one processor configured to translate a vehicle operating action performed by a driver of the actual vehicle to a virtual action in the virtual driving environment, wherein the translation is based in part on images captured by the at least one image sensor; and
      a control subsystem operatively coupled to the capture and processing subsystem, the control subsystem configured to actuate the capture and processing subsystem to operate in a calibration mode and an operational mode, wherein in the calibration mode, the control subsystem provides the driver with a sequence of vehicle operating actions including operation of a plurality of vehicle controls of the actual vehicle, wherein the plurality of vehicle controls includes a steering mechanism, a gear shift, a gas pedal, and a brake pedal, and wherein at least a portion of the vehicle controls are outside of the field of view of the at least one image sensor.

2. The system of claim 1, further comprising the at least one sensor operatively coupled to the processor and functionally associated with a vehicle control element of the plurality of vehicle controls outside of the field of view of the at least one image sensor.

3. The system of claim 2, wherein the translation is further based in part on reading an operation state of the vehicle control element by the at least one sensor.

4. The system of claim 1, wherein the control subsystem includes an application executable on a mobile communication device.

5. The system of claim 1, wherein the projection assembly is removably mountable to the interior of the actual vehicle.

6. The system of claim 1, wherein the projection assembly is deployed outside of the actual vehicle.

7. The system of claim 1, wherein the capture and processing subsystem further includes a communications module for transmitting information to, and receiving information from, the control subsystem.

8. The system of claim 7, further comprising at least one server, wherein the communications module and the control subsystem exchange information via the at least one server.

9. The system of claim 1, further comprising an audio unit operatively coupled to the projection assembly and the capture and processing subsystem, the audio unit operative to produce sound effects corresponding to the virtual driving environment.

10. The system of claim 1, further comprising at least one actuator mechanically coupled to the actual vehicle and functionally associated with the capture and processing subsystem, the at least one actuator operative to induce movement of the actual vehicle in response to the vehicle operating action performed by the driver.

11. The system of claim 1, wherein the capture and processing subsystem is retained within a housing having an attachment mechanism for attaching the housing to at least one of a roof or a headrest of the actual vehicle.

12. A system for simulating operation of a vehicle in an actual vehicle, the system comprising:
   at least one image projection unit for displaying a virtual driving environment, associated with the vehicle, in the interior of the actual vehicle;
   a sensor assembly including:
      an image sensor having a field of view encompassing at least a portion of a driver's side area of the actual vehicle, and
      a plurality of sensors, each sensor reading an operation state of a respective vehicle control of the actual vehicle, wherein each of the respective vehicle controls is outside of the field of view of the image sensor, and wherein each of the respective vehicle controls includes a steering mechanism, a gear shift, a gas pedal, and a brake pedal;
   at least one processor operatively coupled to the at least one image projection unit and the sensor assembly, the at least one processor configured to translate a vehicle operating action performed by a driver of the actual vehicle to a virtual action in the virtual driving environment, wherein the translation is based in part on images captured by the image sensor, and data sent by the plurality of sensors; and
   a control subsystem operatively coupled to the image sensor and the at least one processor, the control subsystem configured to actuate the image sensor and the at least one processor to operate in a calibration mode and an operational mode, wherein in the calibration mode, the control subsystem provides the driver with a sequence of vehicle operating actions including operation of each of the respective vehicle controls of the actual vehicle.

* * * * *